US012645625B1

(12) United States Patent
Chang et al.

(10) Patent No.: US 12,645,625 B1
(45) Date of Patent: Jun. 2, 2026

(54) SEMICONDUCTOR DEVICE AND OPERATION METHOD THEREOF

(71) Applicants: Global Unichip Corporation, Hsinchu (TW); Taiwan Semiconductor Manufacturing Company, Ltd., Hsinchu (TW)

(72) Inventors: Chia-Hsiang Chang, Hsinchu (TW); Igor Elkanovich, Hsinchu (TW); Wen-Lung Tu, Hsinchu (TW); Chao-Hsin Fan Jiang, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 31 days.

(21) Appl. No.: 19/019,512

(22) Filed: Jan. 14, 2025

(51) Int. Cl.
 *G06F 13/36* (2006.01)

(52) U.S. Cl.
 CPC .......... *G06F 13/36* (2013.01); *G06F 2213/40* (2013.01)

(58) Field of Classification Search
 CPC ........ G06F 13/36; H03K 3/012; H03K 5/135; H03K 5/14
 See application file for complete search history.

(56) References Cited

U.S. PATENT DOCUMENTS

| | | | |
|---|---|---|---|
| 9,030,253 B1* | 5/2015 | Ngai | H10W 90/00 |
| | | | 327/594 |
| 9,543,965 B1* | 1/2017 | Ding | H03L 7/04 |
| 2016/0020759 A1* | 1/2016 | Bryan | H03K 5/15013 |
| | | | 327/293 |
| 2017/0004099 A1 | 1/2017 | Best et al. | |
| 2018/0006797 A1 | 1/2018 | Nandy et al. | |
| 2019/0227590 A1* | 7/2019 | Chromczak | G06F 1/10 |
| 2022/0058144 A1* | 2/2022 | Elkanovich | G06F 13/1689 |
| 2025/0379568 A1* | 12/2025 | Kuzmenka | H03K 5/135 |

FOREIGN PATENT DOCUMENTS

TW          202245418 A     11/2022

OTHER PUBLICATIONS

"Office Action of Taiwan counterpart Application", issued on Dec. 18, 2025, p. 1-p. 12.

* cited by examiner

*Primary Examiner* — Phong H Dang
(74) *Attorney, Agent, or Firm* — JCIPRNET

(57)          ABSTRACT

The semiconductor device includes a first die and a second die. The first die includes a first clock tree circuit and a first data channel. An output terminal of the first clock tree circuit is coupled to a trigger terminal of the first data channel. The second die includes a second clock tree circuit, and a second data channel. An input terminal of the second clock tree circuit is coupled to the first die through a clock interconnect to receive a source clock signal. An output terminal of the second clock tree circuit is coupled to a trigger terminal of the second data channel. An input terminal of the second data channel is coupled to an output terminal of the first data channel through a data interconnect.

16 Claims, 9 Drawing Sheets

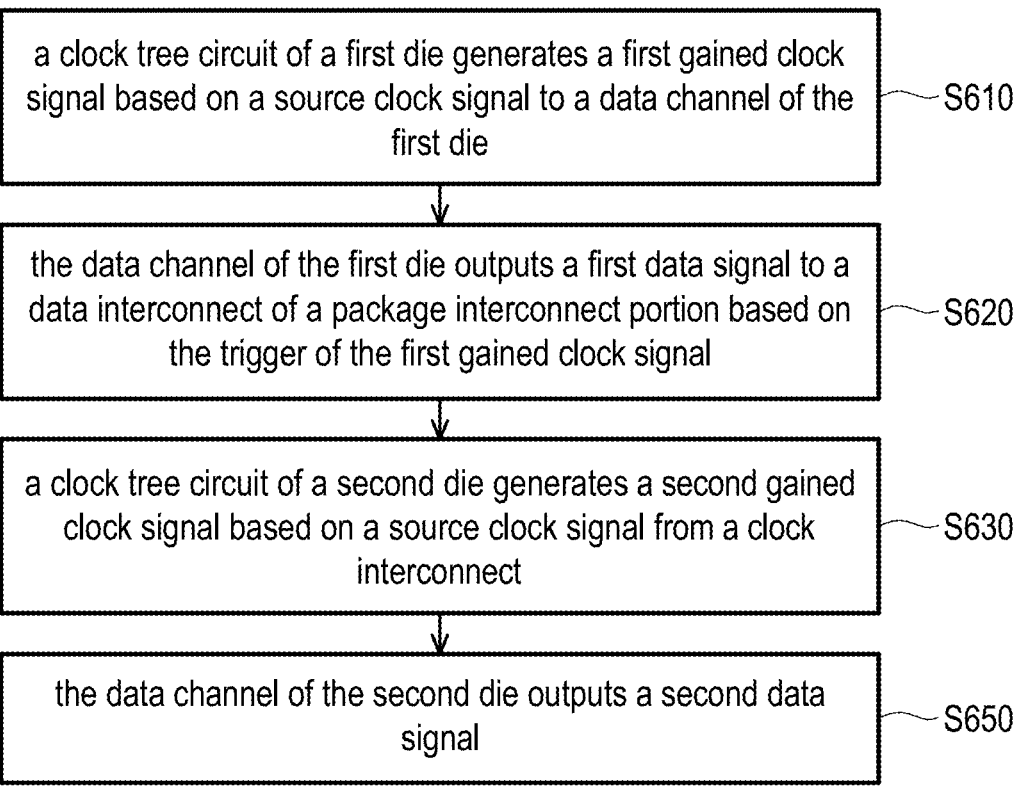

a clock tree circuit of a first die generates a first gained clock signal based on a source clock signal to a data channel of the first die — S610 the data channel of the first die outputs a first data signal to a data interconnect of a package interconnect portion based on the trigger of the first gained clock signal — S620 a clock tree circuit of a second die generates a second gained clock signal based on a source clock signal from a clock interconnect — S630 the data channel of the second die outputs a second data signal — S650

FIG. 6

SEMICONDUCTOR DEVICE AND OPERATION METHOD THEREOF

BACKGROUND

Technical Field

This disclosure relates to an integrated circuit, and in particular to a semiconductor device and an operation method thereof.

Description of Related Art

In the physical layer of an integrated circuit, a clock tree circuit is often required to generate the clock signals used to sample the data signals. In a 2.5-dimensional packaging, the data transfer between different die is based on the timing of the triggering of the clock signals. In general, the phase of the clock signal used by the receiver die should match the phase of the clock signal used by the transmitter die in order to correctly sample the data signal. One of the many technical issues in the field of IC technology is how to efficiently transfer data between different dies.

SUMMARY

The disclosure provides a semiconductor device and an operation method thereof to transmit data signals and clock signals between different dies.

In an embodiment of the disclosure, the semiconductor device includes a first die, a package interconnect portion, and a second die. The first die, the package interconnect portion, and the second die are disposed in a same package. The first die includes a first clock tree circuit and at least one first data channel. Each of at least one output terminal of the first clock tree circuit is coupled to a trigger terminal of a corresponding one of the at least one first data channel. The first clock tree circuit generates at least one first gained clock signal based on a source clock signal to the at least one first data channel. The package interconnect includes a clock interconnect and at least one first data interconnect. A first terminal of the clock interconnect is coupled to the first die to receive the source clock signal. A first terminal of each of the at least one first data interconnect is coupled to an output terminal of a corresponding one of the at least one first data channel of the first die. The second die includes a second clock tree circuit, and at least one second data channel. An input terminal of the second clock tree circuit is coupled to a second terminal of the clock interconnect to receive the source clock signal of the first die. The second clock tree circuit generates at least one second gained clock signal based on the source clock signal from the clock interconnect. Each of at least one output terminal of the second clock tree circuit is coupled to a trigger terminal of a corresponding one of the at least one second data channel. An input terminal of each of the at least one second data channel is coupled to a second terminal of a corresponding one of the at least one first data interconnect.

In an embodiment of the disclosure, the operation method includes the following. At least one first gained clock signal is generated by a first clock tree circuit of a first die of the semiconductor device based on a source clock signal to at least one first data channel of the first die. At least one first data signal is outputted by the at least one first data channel based on a trigger of the at least one first gained clock signal to at least one first data interconnect of a package interconnect portion of the semiconductor device. At least one second gained clock signal is generated by a second clock tree circuit of a second die of the semiconductor device based on the source clock signal from the clock interconnect. At least one second data signal is outputted by the at least one second data channel.

Based on the above, the trigger terminal of the data channel of the second die of the embodiments of the disclosure is equipped with the inverter. The inverter converts the gained clock signal of the clock tree circuit of the second die into the inverted clock signal to the data channel of the second die. The data channel samples the data signal from the first die based on the inverted clock signal. Therefore, the transmission latency of the data signal can be effectively shortened.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

FIG. 6 is a schematic flowchart of an operation method of a semiconductor device according to an embodiment of the disclosure.

DESCRIPTION OF THE EMBODIMENTS

Figure 1A:
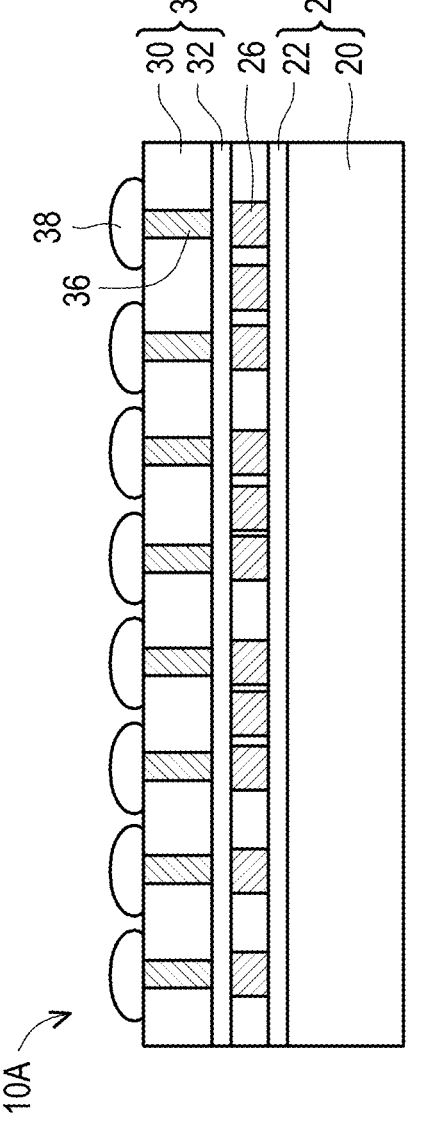
FIG. 1A is a schematic cross-sectional diagram of a three-dimensional structure of a semiconductor device according to an embodiment.

The word "coupling (or connection)" used throughout the specification of this application (including the claims) can refer to any direct or indirect connection means. For example, if a first device is described as being coupled (or connected) to a second device, it should be interpreted as meaning that the first device can be directly connected to the second device, or that the first device can be indirectly connected to the second device by another device or some other means of connection. The terms "first" and "second" mentioned in the full text of the specification of this application (including the claims) are used to name elements or to distinguish different embodiments or scopes, and are not used to limit the upper limit or lower limit of the number of elements, nor is it used to limit the order of elements. In addition, wherever possible, elements/components/steps with the same reference numerals are used in the drawings and embodiments to represent the same or similar parts. Elements/components/steps using the same reference numerals or using the same terms in different embodiments can refer to the relevant descriptions of each other.

The disclosure involves the transfer of data between two dies disposed in the same package. Several embodiments are provided below to introduce the disclosure, but the implementation of the disclosure is not limited to the embodiments.

FIG. 1A is a schematic cross-sectional diagram of a three-dimensional (3D) structure of a semiconductor device 10A according to an embodiment. The semiconductor device 10A may include a die 24 and a die 34. In addition to being distributed horizontally, the die 24 and the die 34 can also be stacked vertically. The die 24 and the die 34 are electrically connected to each other and stacked into a three-dimensional structure to form a three-dimensional semiconductor element. The stacked structure of the semiconductor device 10A can adopt any three-dimensional packaging technology, such as system-on-integrated-chips (SoIC) packaging, wafer on wafer (WoW) packaging, Chip-on-Wafer-on-Substrate, (CoWoS) packaging, or other three-dimensional packaging technology.

In some practical application examples (but not limited to this), the die 34 may be a slave device, and the die 24 may be a master device. The die 24 typically includes a substrate 20 and a circuit layer 22. The die 34 is stacked on top of the die 24. At least one bump 26 (e.g., microbump or hybrid-bump) is formed between the die 24 and the die 34. The die 34 includes a substrate 30 and a circuit layer 32. The through-hole structure of the packaging process, such as a Through-Silicon-Via (TSV) 36 having a connection pad portion 38, is formed at the corresponding position of the die 34. The connection pad portion 38 is formed at the outermost surface corresponding to the TSV 36.

Figure 1B:
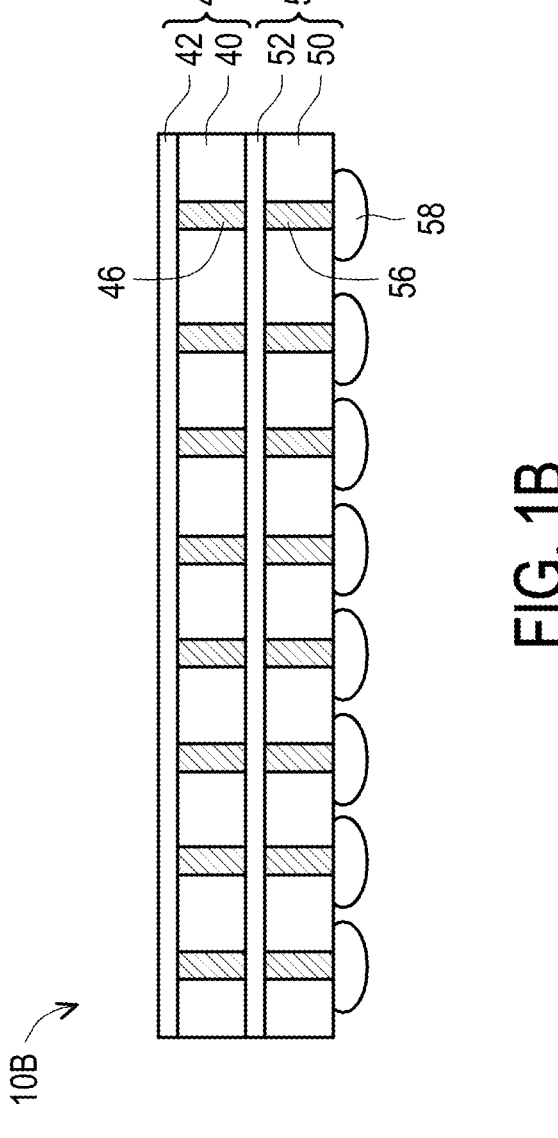
FIG. 1B is a schematic cross-sectional diagram of a three-dimensional structure of a semiconductor device according to another embodiment.

FIG. 1B is a schematic cross-sectional diagram of a three-dimensional structure of a semiconductor device 10B according to another embodiment. The semiconductor device 10B may include a die 44 and a die 54. In addition to being distributed horizontally, the die 44 and the die 54 can also be stacked vertically. The die 44 and the die 54 are electrically connected to each other and stacked into a three-dimensional structure to form a three-dimensional semiconductor element. The stacked structure of the semiconductor device 10B can adopt any three-dimensional packaging technology, such as SoIC packaging, WoW packaging, CoWoS packaging, or other three-dimensional packaging technology. In some practical applications (but not limited to this), the die 54 may be a slave device, and the die 44 may be a master device. The die 44 typically includes a substrate 40 and a circuit layer 42. The through-hole structure of the packaging process, such as a TSV 46, is formed between the die 44 and the die 54. The die 54 includes a substrate 50 and a circuit layer 52. A TSV 56 having a connection pad portion 58 is formed at the corresponding position of the die 54. The connection pad portion 58 is formed at the outermost surface corresponding to the TSV 56.

Figure 1C:
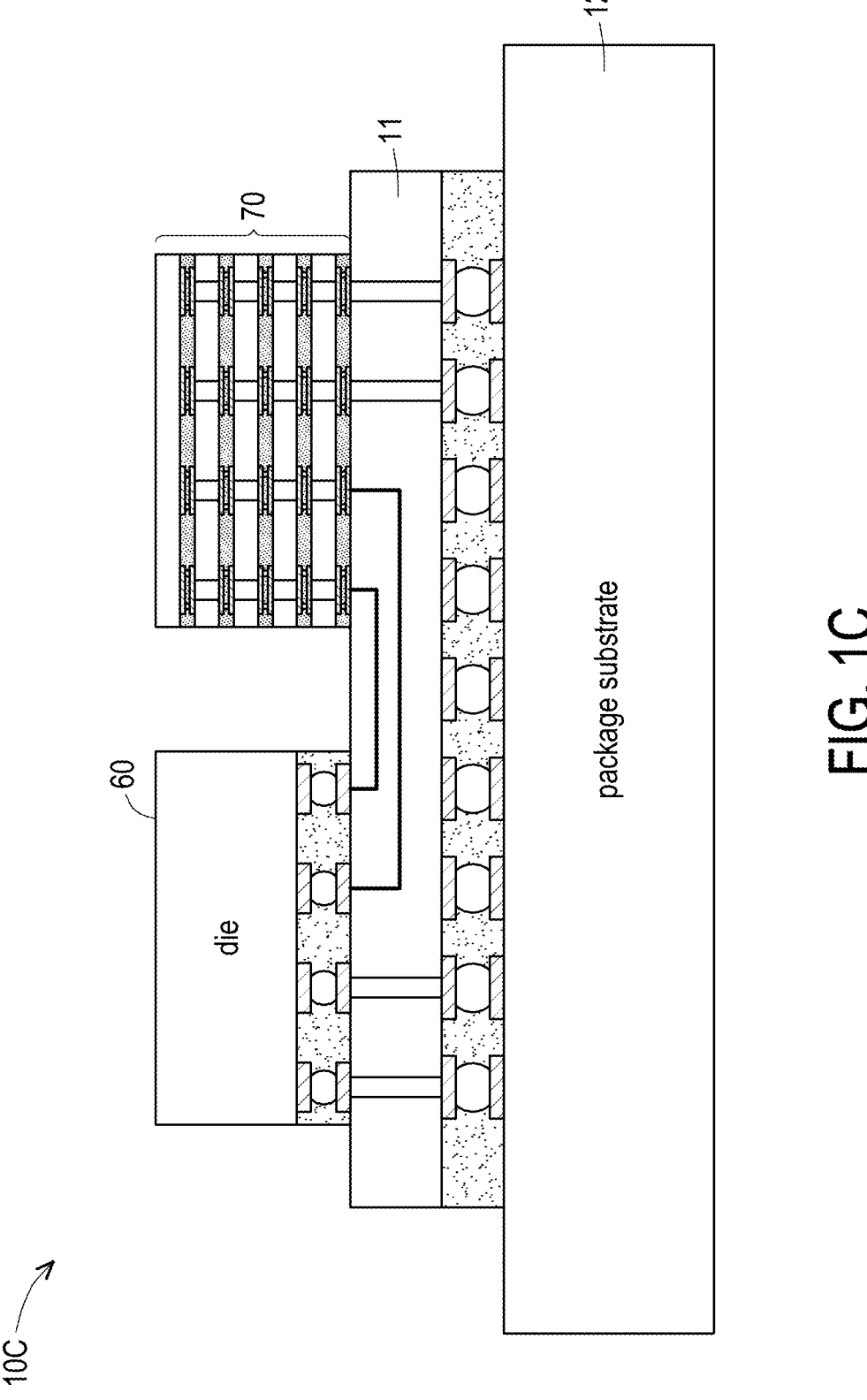
FIG. 1C is a schematic cross-sectional diagram of a 2.5-dimensional packaging structure of a semiconductor device according to still another embodiment.

FIG. 1C is a schematic cross-sectional diagram of a 2.5-dimensional packaging structure of a semiconductor device 10C according to still another embodiment. The semiconductor device 10C shown in FIG. 1C may include a die 60 and a die 70. In the embodiment shown in FIG. 1C, the die 70 is a three-dimensional semiconductor element formed by vertically stacking multiple dies. The die 60 and the die 70 are disposed on an interposer 11, and the interposer 11 is disposed on a package substrate 12. The die 60 and the die 70 are electrically connected to each other through interconnects (wires) of the interposer 11. In some practical applications (but not limited to this), the die 70 may be a slave device (for example, a memory cell die and a controller die), and the die 60 may be a master device (for example, a central processing unit).

Figure 1D:
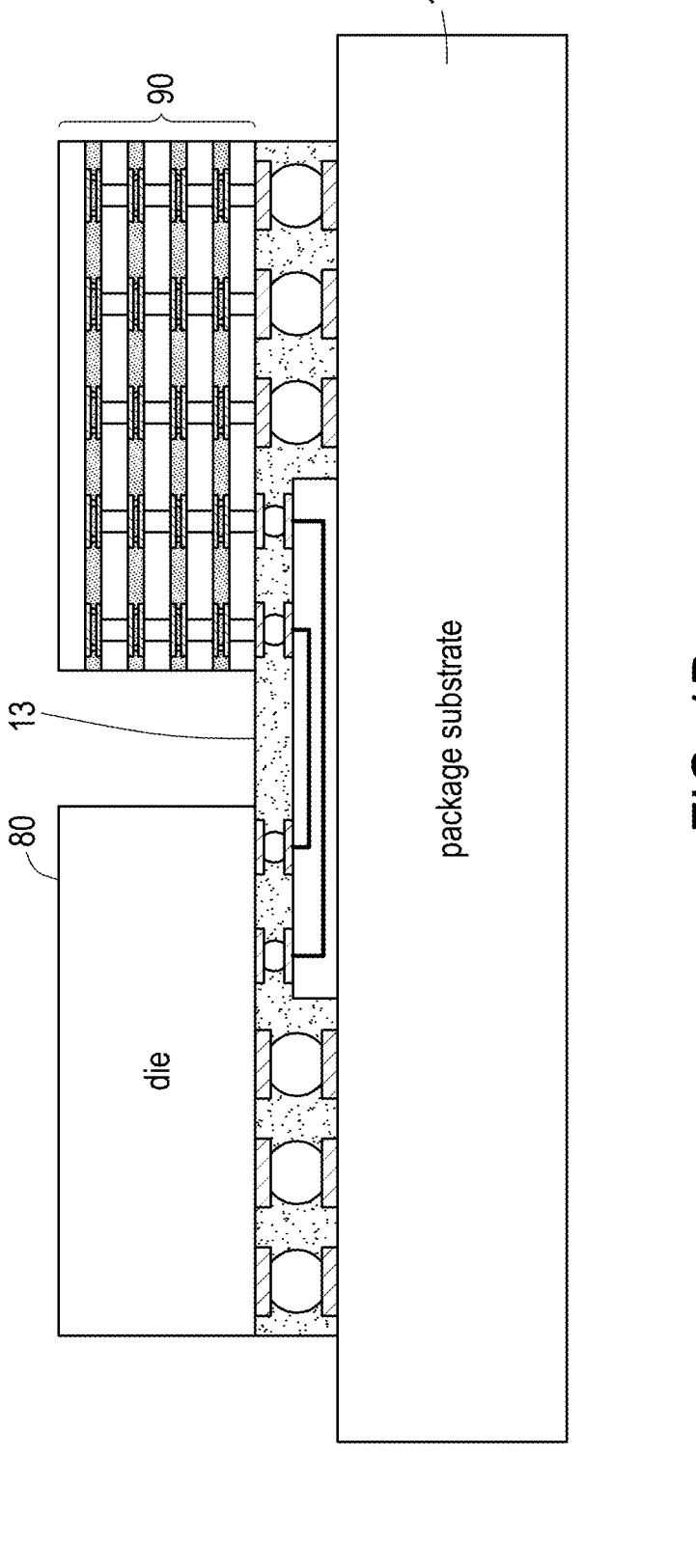
FIG. 1D is a schematic cross-sectional diagram of a 2.5-dimensional packaging structure of a semiconductor device according to yet another embodiment.

FIG. 1D is a schematic cross-sectional diagram of a 2.5-dimensional packaging structure of a semiconductor device 10D according to yet another embodiment. The semiconductor device 10D shown in FIG. 1D may include a die 80 and a die 90. In the embodiment shown in FIG. 1D, the die 90 is a three-dimensional semiconductor element formed by vertically stacking multiple dies. The die 80 and the die 90 are disposed on a bridge-chip 13, and the bridge-chip 13 is disposed on the package substrate 14. The die 80 and the die 90 are electrically connected to each other through the interconnect of the bridge-chip 13. In some practical applications (but not limited to this), the die 90 may be a slave device (for example, a memory cell die and a controller die), and the die 80 may be a master device (for example, a central processing unit).

Figure 2:
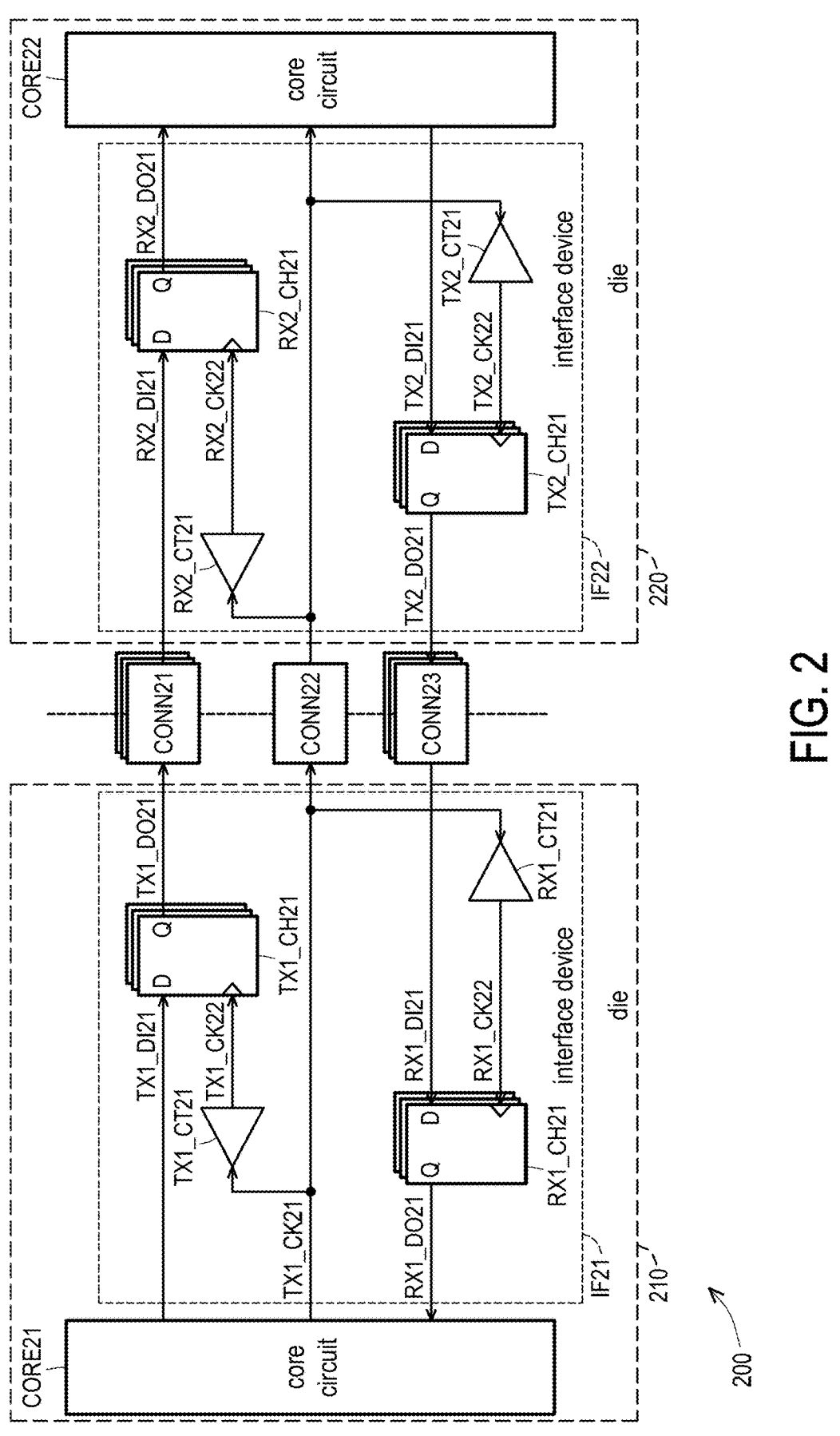
FIG. 2 is a schematic diagram of a circuit block of a semiconductor device according to an embodiment of the disclosure.

FIG. 2 is a schematic diagram of a circuit block of a semiconductor device 200 according to an embodiment of the disclosure. The semiconductor device 200 shown in FIG. 2 includes a die 210 and a die 220. The die 210 and the die 220 are disposed in the same package. For example (but not limited to this), the die 210 and the die 220 are disposed in the same package in the three-dimensional structure shown in FIG. 1A or FIG. 1B. Therefore, the die 210 and the die 220 shown in FIG. 2 can refer to and by analogy with the relevant descriptions of the die 24 and the die 34 shown in FIG. 1A, or refer to and by analogy with the relevant descriptions of the die 44 and the die 54 shown in FIG. 1B. Alternatively, the die 210 and the die 220 are disposed in the same package in a 2.5-dimensional structure as shown in FIG. 1C or FIG. 1D. Therefore, the die 210 and the die 220 shown in FIG. 2 can refer to and by analogy with the relevant descriptions of the die 60 and the die 70 shown in FIG. 1C, or refer to and by analogy with the relevant descriptions of the die 80 and the die 90 shown in FIG. 1D.

The die 210 and the die 220 can be electrically connected to each other through a package interconnect portion. In some application scenarios, the package interconnect portion includes an interposer or a bridge-chip in a 2.5-dimensional package. In the embodiment shown in FIG. 2, the package interconnect portion includes a data interconnect CONN21, a clock interconnect CONN22, and a data interconnect CONN23. The die 210 and the die 220 can be electrically connected to each other through different interconnects CONN21, CONN22 and CONN23 in the package interconnect portion. According to the actual design, the die 210 and the die 220 can be stacked into a three-dimensional structure or a 2.5-dimensional structure. For example, the interconnects CONN21, CONN22, and CONN23 shown in FIG. 2 can be implemented using bumps. That is, the interconnects CONN21, CONN22, and CONN23 shown in FIG. 2 can refer to and by analogy with the relevant description of the bumps 26 shown in FIG. 1A. In other application examples, the interconnects CONN21, CONN22, and CONN23 shown in FIG. 2 can be implemented using TSV. That is, the interconnects CONN21, CONN22, and CONN23 shown in FIG. 2 can refer to and by analogy with the relevant description of the TSV 46 shown in FIG. 1B. In some application examples, the interconnects CONN21, CONN22, and CONN23 shown in FIG. 2 can be implemented using an interposer. That is, the interconnects CONN21, CONN22 and CONN23 shown in FIG. 2 can refer to and by analogy with the relevant descriptions of the interconnects (wires) of the interposer 11 shown in FIG. 1C. In some application examples, the interconnects CONN21, CONN22, and CONN23 shown in FIG. 2 can be implemented using a bridge-chip. That is, the interconnects CONN21, CONN22, and CONN23 shown in FIG. 2 can refer to and by analogy with the relevant description of interconnects of the bridge-chip 13 shown in FIG. 1D.

The die 210 includes a core circuit CORE21 and an interface device IF21, and the die 220 includes a core circuit CORE22 and an interface device IF22. According to different designs, in some embodiments, the implementation of the core circuit CORE21 and/or CORE22 may be hardware circuits. In other embodiments, the implementation of the core circuit CORE21 and/or CORE22 may be a combination of hardware and firmware.

In terms of hardware, the core circuit CORE21 and/or CORE22 can be implemented as logic circuits on integrated circuits. For example, the related functions of the core circuit CORE21 and/or CORE22 can be implemented in one or more controllers, microcontrollers, microprocessors, application-specific integrated circuits (ASIC), digital signal processor (DSP), Field Programmable Gate Array (FPGA), Central Processing Unit (CPU), and/or various logic blocks, modules, and circuits of other processing units. The related functions of the core circuit CORE21 and/or CORE22 can be implemented as hardware circuits using hardware description languages (such as Verilog HDL or VHDL) or other suitable programming languages, such as various logic blocks, modules, and circuits in the integrated circuits.

In terms of firmware, the related functions of the core circuit CORE21 and/or CORE22 can be implemented as programming codes. For example, general programming languages (such as C, C++, or combination language) or other suitable programming languages are used to implement the core circuit CORE21 and/or CORE22. The programming code can be recorded/stored in a "non-transitory machine-readable storage medium". In some embodiments, the non-transitory machine-readable storage medium includes, for example, a semiconductor memory and/or a storage device. The electronic device (such as a CPU, controller, microcontroller or microprocessor) can read and execute the programming code from the non-transitory machine-readable storage medium, thereby realizing the related functions of the core circuit CORE21 and (or) CORE22.

The interface device IF21 of the die 210 includes a clock tree circuit TX1_CT21, at least one data channel TX1_CH21, a clock tree circuit RX1_CT21, and at least one data channel RX1_CH21. The clock tree circuit TX1_CT21 receives a source clock signal TX1_CK21 of the die 210. Each of at least one output terminal of the clock tree circuit TX1_CT21 is coupled to a trigger terminal of a corresponding one of the at least one data channel TX1_CH21. The clock tree circuit TX1_CT21 generates at least one gained clock signal TX1_CK22 based on the source clock signal TX1_CK21 to the trigger terminal of the data channel TX1_CH21. The clock tree circuit TX1_CT21 can gain the fan-out of the source clock signal TX1_CK21. The data channel TX1_CH21 can sample a single data rate (SDR) data signal (such a data signal TX1_DI21) from the core circuit CORE21 of the die 210 based on the trigger of the gained clock signal TX1_CK22 to generate a sampling result (such as a data signal TX1_DO21, etc.). The data channel TX1_CH21 can output the data signal TX1_DO21 to the die 220 through the data interconnect CONN21 of the package interconnect portion. In addition, the interface device IF21 can output the source clock signal TX1_CK21 to the die 220 through the clock interconnect CONN22 of the package interconnect portion.

The die 220 can output a data signal TX2_DO21 to the data channel RX1_CH21 of the die 210 through the data interconnect CONN23 of the package interconnect portion. The clock tree circuit RX1_CT21 gain the fan-out of the source clock signal TX1_CK21, and generates multiple gained clock signals RX1_CK22 to the trigger terminal of the data channel RX1_CH21. The data channel RX1_CH21 can sample a data signal RX1_DI21 from the data interconnect CONN23 based on the trigger of the gained clock signal RX1_CK22 to generate a data signal RX1_DO21 to the core circuit CORE21 of the die 210.

The interface device IF22 of the die 220 includes a clock tree circuit RX2_CT21, at least one data channel RX2_CH21, a clock tree circuit TX2_CT21, and at least one data channel TX2_CH21. The first terminal of the clock interconnect CONN22 is coupled to the die 210 to receive the source clock signal TX1_CK21. The input terminal of the clock tree circuit RX2_CT21 is coupled to the second terminal of the clock interconnect CONN22 to receive the source clock signal TX1_CK21 of the die 210. The clock tree circuit RX2_CT21 generates at least one gained clock signal RX2_CK22 based on the source clock signal TX1_CK21 from the clock interconnect CONN22 to the trigger terminal of the data channel RX2_CH21.

The first terminal of each data interconnect CONN21 is coupled to the output terminal of a corresponding one of the data channel TX1_CH21 of the die 210. The input terminal of each data channel RX2_CH21 of the die 220 is coupled to the second terminal of a corresponding one of the data interconnect CONN21 to receive a data signal RX2_DI21. The data channel RX2_CH21 can sample the data signal RX2_DI21 from the data interconnect CONN21 based on the trigger of the gained clock signal RX2_CK22 to generate a data signal RX2_DO21 to the core circuit CORE22.

The clock tree circuit TX2_CT21 receives the source clock signal TX1_CK21 of the clock interconnect CONN22. The clock tree circuit TX2_CT21 generates multiple gained clock signals TX2_CK22 based on the source clock signal TX1_CK21 to the trigger terminal of the data channel TX2_CH21. The data channel TX2_CH21 can sample a data signal TX2_DI21 from the core circuit CORE22 of the die 220 based on the trigger of the gained clock signal TX2_CK22 to generate the data signal TX2_DO21. The data channel TX2_CH21 can output the data signal TX2_DO21 to the die 210 through the data interconnect CONN23 of the package interconnect portion.

Figure 3:
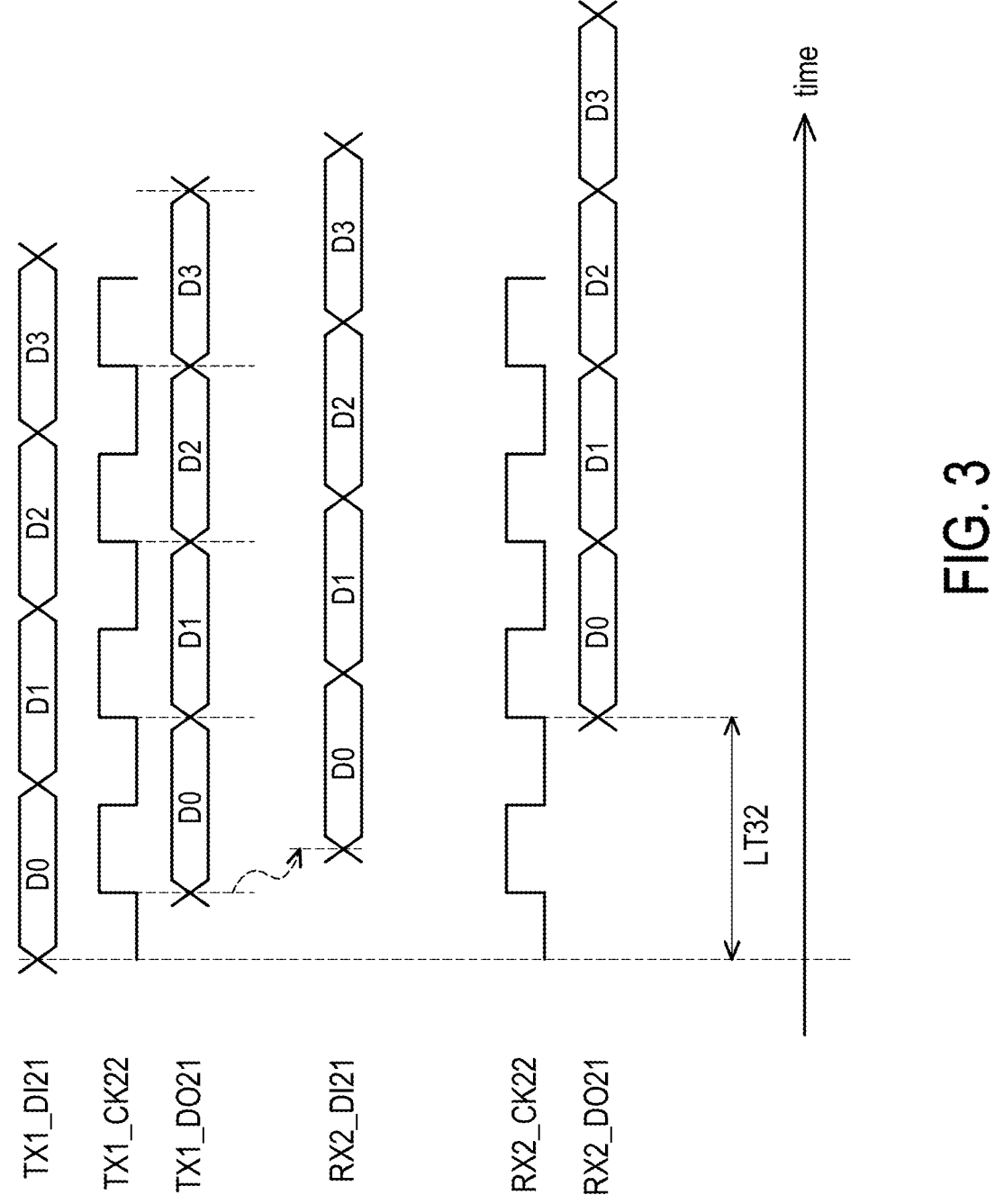
FIG. 3 is a schematic diagram of timing of a data signal and a clock signal according to an embodiment of the disclosure.

FIG. 3 is a schematic diagram of timing of a data signal and a clock signal according to an embodiment of the disclosure. The horizontal axis of FIG. 3 represents time. The data signal TX1_DI21, the gained clock signal TX1_CK22, the data signal TX1_DO21, the data signal RX2_DI21, the gained clock signal RX2_CK22, and the data signal RX2_DO21 shown in FIG. 3 can refer to the relevant description of FIG. 2. Data D0, D1, D2, and D3 shown in FIG. 3 represent the data content (such as data, commands and/or addresses) output by the die 210 to the die 220.

Referring to FIG. 2 and FIG. 3, the data channel TX1_CH21 can sample the data signal TX1_DI21 from the core circuit CORE21 based on the trigger of the gained clock signal TX1_CK22. In the embodiment shown in FIG. 3, the data channel TX1_CH21 samples the data signal TX1_DI21 based on the rising edge of the gained clock signal TX1_CK22, and generates the data signal TX1_DO21 to the data interconnect CONN21. The data signal TX1_DO21 is transmitted through the data interconnect CONN21 and becomes the data signal RX2_DI21.

The data channel RX2_CH21 can sample the data signal RX2_DI21 from the data interconnect CONN21 based on the trigger of the gained clock signal RX2_CK22. In the embodiment shown in FIG. 3, the data channel RX2_CH21 samples the data signal RX2_DI21 based on the rising edge of the gained clock signal RX2_CK22 to generate the data signal RX2_DO21 to the core circuit CORE22. The data signal TX1_DI21 sent by the core circuit CORE21 and the data signal RX2_DO21 received by the core circuit CORE22 have a transmission latency time of LT32.

Figure 4:
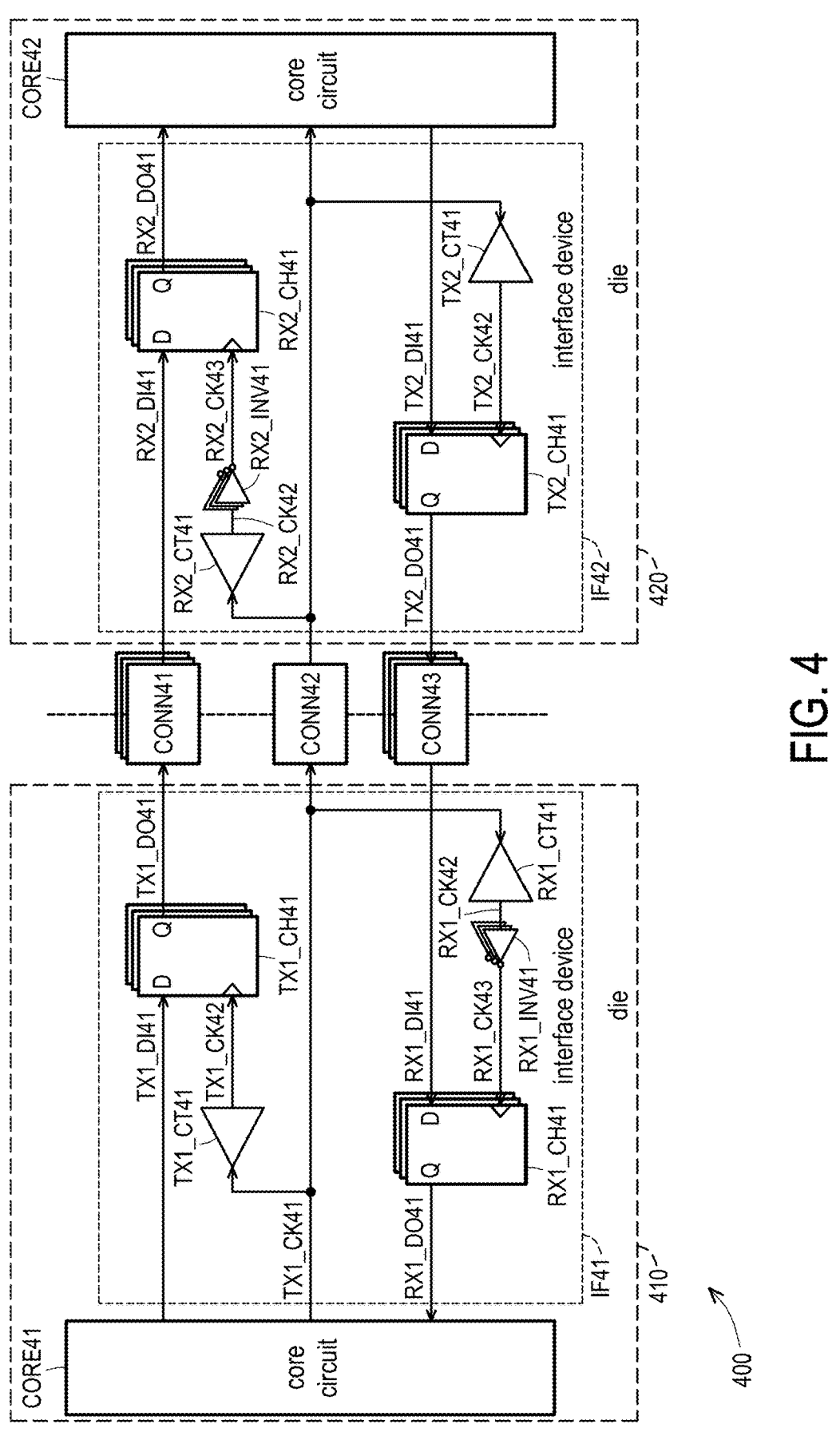
FIG. 4 is a schematic diagram of a circuit block of a semiconductor device according to an embodiment of the disclosure.

FIG. 4 is a schematic diagram of a circuit block of a semiconductor device 400 according to an embodiment of the disclosure. The semiconductor device 400 shown in FIG. 4 includes a die 410 and a die 420. The die 410 and the die 420 are disposed in the same package. For example (but not limited to this), the die 410 and the die 420 are disposed in the same package in the three-dimensional structure shown in FIG. 1A or FIG. 1B. Therefore, the die 410 and the die 420 shown in FIG. 4 can refer to and by analogy with the relevant descriptions of the die 24 and the die 34 shown in FIG. 1A, or refer to and by analogy with the relevant descriptions of the die 44 and the die 54 shown in FIG. 1B. Alternatively, the die 410 and the die 420 are disposed in the same package in a 2.5-dimensional structure as shown in FIG. 1C or FIG. 1D. Therefore, the die 410 and die 420 shown in FIG. 4 can refer to and by analogy with the relevant descriptions of the die 60 and the die 70 shown in FIG. 1C, or refer to and by analogy with the relevant descriptions of the die 80 and the die 90 shown in FIG. 1D.

The die 410 and the die 420 can be electrically connected to each other. In the embodiment shown in FIG. 4, the die 410 and the die 420 can be electrically connected to each other through different interconnects CONN41, CONN42, and CONN43 of the package interconnect portion. According to the actual design, the die 410 and the die 420 can be stacked into a three-dimensional structure or a 2.5-dimensional structure. For example, the interconnects CONN41, CONN42, and CONN43 shown in FIG. 4 can be implemented using bumps. That is, the interconnects CONN41, CONN42, and CONN43 shown in FIG. 4 can refer to and by analogy with the relevant description of the bumps 26 shown in FIG. 1A. In other application examples, the interconnects CONN41, CONN42, and CONN43 shown in FIG. 4 can be implemented using TSV. That is, the interconnects CONN41, CONN42, and CONN43 shown in FIG. 4 can refer to and by analogy with the relevant description of the TSV 46 shown in FIG. 1B. In some application examples, the interconnects CONN41, CONN42, and CONN43 shown in FIG. 4 can be implemented using an interposer. That is, the interconnects CONN41, CONN42, and CONN43 shown in FIG. 4 can refer to and by analogy with the relevant description of the interconnects (wires) of the interposer 11 shown in FIG. 1C. In some application examples, the interconnects CONN41, CONN42, and CONN43 shown in FIG. 4 can be implemented using a bridge-chip. That is, the interconnects CONN41, CONN42, and CONN43 shown in FIG. 4 can refer to and by analogy with the relevant description of the interconnects of bridge-chip 13 shown in FIG. 1D 13.

The die 410 includes a core circuit CORE41 and an interface device IF41. The interface device IF41 of the die 410 includes a clock tree circuit TX1_CT41, at least one data channel TX1_CH41, a clock tree circuit RX1_CT41, at least one inverter RX1_INV41, and at least one data channel RX1_CH41. The die 410, the core circuit CORE41, the interface device IF41, the clock tree circuit TX1_CT41, the data channel TX1_CH41, the clock tree circuit RX1_CT41, and the data channel RX1_CH41 shown in FIG. 4 can refer to and by analogy with the relevant description of the die 210, the core circuit CORE21, the interface device IF21, the clock tree circuit TX1_CT21, the data channel TX1_CH21, the clock tree circuit RX1_CT21, and the data channel RX1_CH21.

The clock tree circuit TX1_CT41 generates at least one gained clock signal TX1_CK42 based on a source clock signal TX1_CK41 to the trigger terminal of the data channel TX1_CH41. The data channel TX1_CH41 samples a data signal TX1_DI41 based on the trigger of the gained clock signal TX1_CK42 to generate a data signal TX1_DO41 to the data interconnect CONN41. The interface device IF41 also outputs the source clock signal TX1_CK41 to the die 420 through the clock interconnect CONN42 of the package interconnect portion.

The clock tree circuit RX1_CT41 gains the source clock signal TX1_CK41 to generate multiple gained clock signals RX1_CK42. Each of at least one output terminal of the clock tree circuit RX1_CT41 is coupled to an input terminal of a corresponding one of the at least one inverter RX1_INV41. The output terminal of each inverter RX1_INV41 is coupled to the trigger terminal of a corresponding one of the at least one data channel RX1_CH41 to provide an inverted clock signal RX1_CK43. The data channel RX1_CH41 samples a data signal RX1_DI41 from the data interconnect CONN43 based on the trigger of the inverted clock signal RX1_CK43 to generate the data signal RX1_DO41 to the core circuit CORE41.

The die 420 includes a core circuit CORE42 and an interface device IF42. The interface device IF42 of the die 420 includes a clock tree circuit RX2_CT41, at least one inverter RX2_INV41, at least one data channel RX2_CH41, a clock tree circuit TX2_CT41, and at least one data channel TX2_CH41. The die 420, the core circuit CORE42, the interface device IF42, the clock tree circuit RX2_CT41, the data channel RX2_CH41, the clock tree circuit TX2_CT41, and the data channel TX2_CH41 shown in FIG. 4 can refer to and by analogy with the relevant description of the die 220, the core circuit CORE22, the interface device IF22, the clock tree circuit RX2_CT21, the data channel RX2_CH21, the clock tree circuit TX2_CT21, and the data channel TX2_CH21 shown in FIG. 2.

The input terminal of the clock tree circuit RX2_CT41 is coupled to the second terminal of the clock interconnect CONN42 to receive the source clock signal TX1_CK41 of the die 410. The clock tree circuit RX2_CT41 generates at least one gained clock signal RX2_CK42 based on the source clock signal TX1_CK41 from the clock interconnect CONN42. Each of at least one output terminal of the clock tree circuit RX2_CT41 is coupled to an input terminal of a corresponding one of the at least one inverter RX2_INV41. The output terminal of each of the inverter RX2_INV41 is coupled to the trigger terminal of a corresponding one of the at least one data channel RX2_CH41 to provide an inverted clock signal RX2_CK43. The input terminal of each data channel RX2_CH41 is coupled to the second terminal of a corresponding one of the data interconnect CONN41. The data channel RX2_CH41 samples a data signal RX2_DI41 from the data interconnect CONN41 based on the trigger of the inverted clock signal RX2_CK43 to generate the data signal RX2_DO41 to the core circuit CORE42.

The clock tree circuit TX2_CT41 generates multiple gained clock signals TX2_CK42 based on the source clock signal TX1_CK41 of the clock interconnect CONN42 to the trigger terminal of the data channel TX2_CH41. The data channel TX2_CH41 samples a data signal TX2_DI41 of the die 420 based on the trigger of the gained clock signal TX2_CK42 to generate a data signal TX2_DO41. The output terminal of each data channel TX2_CH41 is coupled to the first terminal of a corresponding one of the data interconnect CONN43. The data channel TX2_CH41 can output the data signal TX2_DO41 to the die 410 through the data interconnect CONN43.

Figure 5:
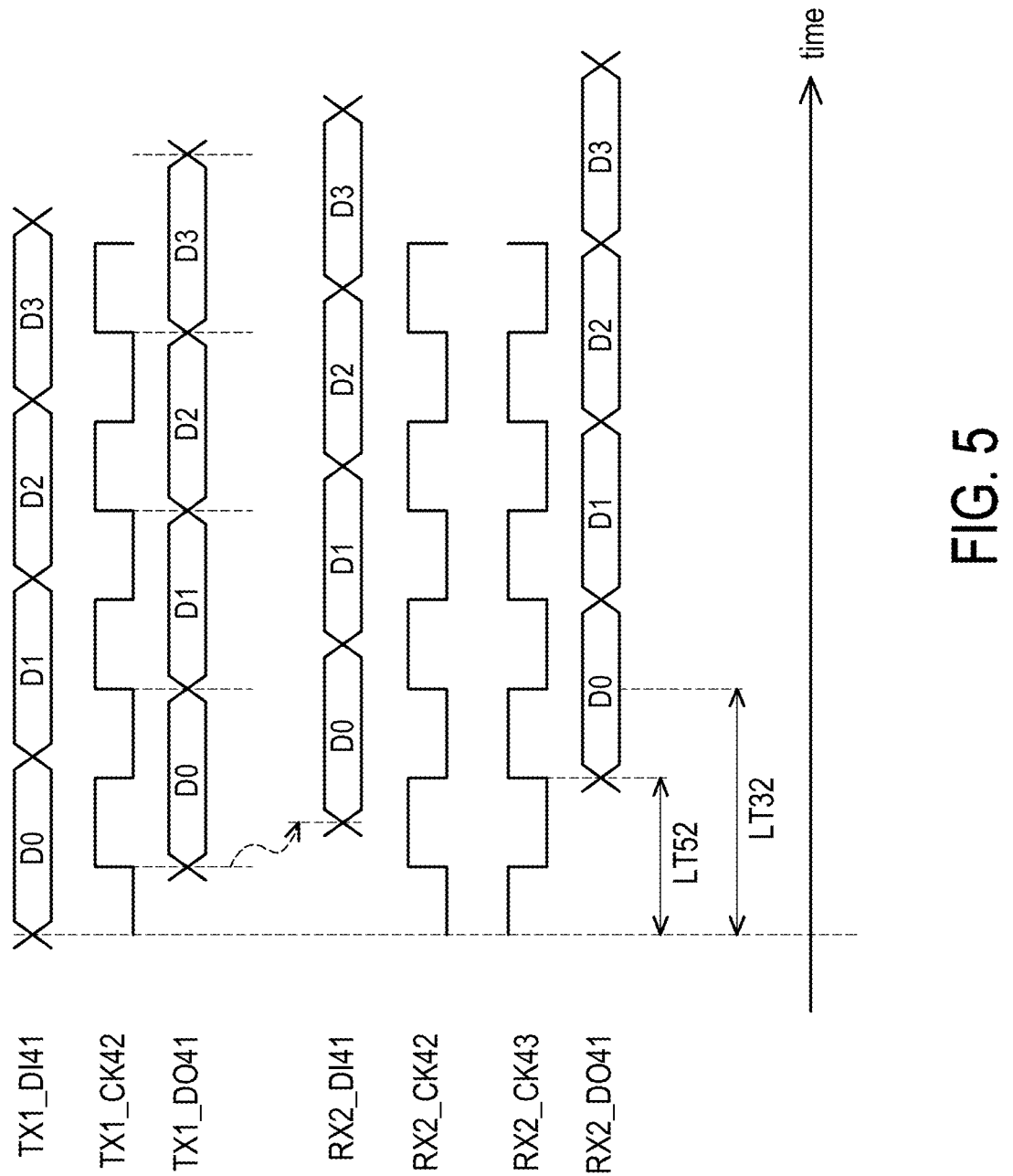
FIG. 5 is a schematic diagram of timing of a data signal and a clock signal according to another embodiment of the disclosure.

FIG. 5 is a schematic diagram of timing of a data signal and a clock signal according to another embodiment of the disclosure. The horizontal axis of FIG. 5 represents time. The data signal TX1_DI41, the gained clock signal TX1_CK42, the data signal TX1_DO41, the data signal RX2_DI41, the gained clock signal RX2_CK42, the inverted clock signal RX2_CK43, and the data signal RX2_DO41 shown in FIG. 5 can refer to the relevant description of FIG. 4. Data DO, D1, D2 and D3 shown in FIG. 5 represent the data content (such as data, commands and/or addresses) output by the die 410 to the die 420.

Referring to FIG. 4 and FIG. 5, the data channel TX1_CH41 can sample the data signal TX1_DI41 from the core circuit CORE41 based on the trigger of the gained clock signal TX1_CK42. In the embodiment shown in FIG. 5, the data channel TX1_CH41 samples the data signal TX1_DI41 based on the rising edge of the gained clock signal TX1_CK42, and generates the data signal TX1_DO41 to the data interconnect CONN41. The data signal TX1_DO41 is transmitted through the data interconnect CONN41 and becomes the data signal RX2_DI41.

The clock tree circuit RX2_CT41 generates the gained clock signal RX2_CK42 based on the source clock signal TX1_CK41 of the clock interconnect CONN42. The inverter RX2_INV41 converts the gained clock signal RX2_CK42 into the inverted clock signal RX2_CK43. The data channel RX2_CH41 can sample the data signal RX2_DI41 from the data interconnect CONN41 based on the trigger of the inverted clock signal RX2_CK43. In the embodiment shown in FIG. 5, the data channel RX2_CH41 samples the data signal RX2_DI41 based on the rising edge of the inverted clock signal RX2_CK43 to generate the data signal RX2_DO41 to the core circuit CORE42. The data signal TX1_DI41 sent by the core circuit CORE41 and the data signal RX2_DO41 received by the core circuit CORE42 have a transmission latency time of LT52.

To sum up, the trigger terminal of the data channel RX2_CH41 of the die 420 is equipped with the inverter RX2_INV41. The inverter RX2_INV41 converts the gained clock signal RX2_CK42 of the clock tree circuit RX2_CT41 of the die 420 into the inverted clock signal RX2_CK43 to the data channel RX2_CH41 of the die 420. The data channel RX2_CH41 samples the data signal RX2_DI41 from the die 410 based on the inverted clock signal RX2_CK43 to generate the data signal RX2_DO41 to the core circuit CORE42. Therefore, compared with the transmission latency time LT32 shown in FIG. 3, in the embodiments shown in FIG. 4 and FIG. 5, the transmission latency time LT52 of the data signal of the semiconductor device 400 can be effectively shortened.

FIG. 6 is a schematic flowchart of an operation method of a semiconductor device according to an embodiment of the disclosure. In step S610, the first clock tree circuit of the first die of the semiconductor device generates the first gained clock signal based on the source clock signal to the first data channel of the first die. In step S620, the first data channel of the first die outputs the first data signal to the data interconnect of the package interconnect portion of the semiconductor device based on the trigger of the first gained clock signal. In step S630, the second clock tree circuit of the second die of the semiconductor device generates the second gained clock signal based on the source clock signal from the clock interconnect. In step S650, the second data channel of the second die outputs the second data signal.

In some embodiments, the operation method further includes the following. The at least one second data channel output at least one second data signal based on triggering of the at least one second gained clock signal.

In some embodiments, the operation method further includes the following. At least one inverter of the second die generates at least one inverted clock signal based on the at least one second gained clock signal to the at least one second data channel. The at least one second data channel output at least one second data signal based on triggering of the at least one inverted clock signal.

In some embodiments, the operation method further includes the following. The third clock tree circuit of the second die generates the third gained clock signal based on the source clock signal from the clock interconnect to the third data channel of the second die. The third data channel outputs the third data signal based on the trigger of the third gained clock signal to the second data interconnect of the package interconnect portion.

In some embodiments, the operation method further includes the following. The fourth clock tree circuit of the first die generates the fourth gained clock signal based on the source clock signal of the first die.

In some embodiments, the operation method further includes the following. The at least one fourth data channel output at least one fourth data signal based on triggering of the at least one fourth gained clock signal.

In some embodiments, the operation method further includes the following. The inverter of the first die generates the inverted clock signal based on the fourth gained clock signal to the fourth data channel of the first die. The at least one fourth data channel output at least one fourth data signal based on triggering of the at least one inverted clock signal.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A semiconductor device comprising:
a first die comprising a first clock tree circuit and at least one first data channel, wherein each of at least one output terminal of the first clock tree circuit is coupled to a trigger terminal of a corresponding one of the at least one first data channel, and the first clock tree circuit generates at least one first gained clock signal based on a source clock signal to the at least one first data channel;
a package interconnect portion comprising a clock interconnect and at least one first data interconnect, wherein a first terminal of the clock interconnect is coupled to the first die to receive the source clock signal, and a first terminal of each of the at least one first data interconnect is coupled to an output terminal of a corresponding one of the at least one first data channel of the first die; and a second die comprising a second clock tree circuit and at least one second data channel, wherein the first die and the second die are disposed in a same package, an input terminal of the second clock tree circuit is coupled to a second terminal of the clock interconnect to receive the source clock signal of the first die, the second clock tree circuit generates at least one second gained clock signal based on the source clock signal from the clock interconnect, each of at least one output terminal of the second clock tree circuit is coupled to a trigger terminal of a corresponding one of the at least one second data channel, and an input terminal of each of the at least one second data channel is coupled to a second terminal of a corresponding one of the at least one first data interconnect.

2. The semiconductor device according to claim 1, wherein the package interconnect portion comprises an interposer or a bridge-chip in a 2.5-dimensional package.

3. The semiconductor device according to claim 1, wherein the package interconnect portion comprises a Through-Silicon-Via or a bump in a three-dimensional structure.

4. The semiconductor device according to claim 1, wherein the second die further comprises:

at least one inverter, wherein an input terminal of each of the at least one inverter is coupled to a corresponding one of the at least one output terminal of the second clock tree circuit, an output terminal of each of the at least one inverter is coupled to the trigger terminal of a corresponding one of the at least one second data channel, and each of the at least one output terminal of the second clock tree circuit is coupled to the trigger terminal of a corresponding one of the at least one second data channel through a corresponding one of the at least one inverter.

5. The semiconductor device according to claim 1, wherein the package interconnect portion further comprises at least one second data interconnect, and the second die further comprises:

a third clock tree circuit, wherein an input terminal of the third clock tree circuit is coupled to the second terminal of the clock interconnect to receive the source clock signal of the first die; and at least one third data channel, wherein each of at least one output terminal of the third clock tree circuit is coupled to a trigger terminal of a corresponding one of the at least one third data channel, the third clock tree circuit generates at least one third gained clock signal to the at least one third data channel, and an output terminal of each of the at least one third data channel is coupled to a first terminal of a corresponding one of the at least one second data interconnect.

6. The semiconductor device according to claim 5, wherein the first die further comprises:

a fourth clock tree circuit, wherein the fourth clock tree circuit generates at least one fourth gained clock signal based on the source clock signal; and at least one fourth data channel, wherein a trigger terminal of each of the at least one fourth data channel is coupled to a corresponding one of at least one output terminal of the fourth clock tree circuit, and an input terminal of each of the at least one fourth data channel is coupled to a second terminal of a corresponding one of the at least one second data interconnect.

7. The semiconductor device according to claim 6, wherein the first die further comprises:

at least one inverter, wherein an input terminal of each of the at least one inverter is coupled to a corresponding one of the at least one output terminal of the fourth clock tree circuit, an output terminal of each of the at least one inverter is coupled to the trigger terminal of a corresponding one of the at least one fourth data channel, and each of the at least one output terminal of the fourth clock tree circuit is coupled to the trigger terminal of a corresponding one of the at least one fourth data channel through a corresponding one of the at least one inverter.

8. An operation method of a semiconductor device, comprising:

generating at least one first gained clock signal by a first clock tree circuit of a first die of the semiconductor device based on a source clock signal to at least one first data channel of the first die, wherein each of at least one output terminal of the first clock tree circuit is coupled to a trigger terminal of a corresponding one of the at least one first data channel;

outputting at least one first data signal by the at least one first data channel based on a trigger of the at least one first gained clock signal to at least one first data interconnect of a package interconnect portion of the semiconductor device, wherein a first terminal of each of the at least one first data interconnect is coupled to an output terminal of a corresponding one of the at least one first data channel of the first die, and a first terminal of a clock interconnect of the package interconnect portion is coupled to the first die to receive the source clock signal;

generating at least one second gained clock signal by a second clock tree circuit of a second die of the semiconductor device based on the source clock signal from the clock interconnect, wherein the first die and the second die are disposed in a same package, and an input terminal of the second clock tree circuit is coupled to a second terminal of the clock interconnect; and outputting at least one second data signal by the at least one second data channel, wherein a trigger terminal of each of the at least one second data channel is coupled to a corresponding one of at least one output terminal of the second clock tree circuit, and an input terminal of each of the at least one second data channel is coupled to a second terminal of a corresponding one of the at least one first data interconnect.

9. The operation method according to claim 8, wherein the package interconnect portion comprises an interposer or a bridge-chip in a 2.5-dimensional package.

10. The operation method according to claim 8, wherein the package interconnect portion comprises a Through-Silicon-Via or a bump in a three-dimensional structure.

11. The operation method according to claim 8, further comprising:

outputting at least one second data signal by the at least one second data channel based on triggering of the at least one second gained clock signal.

12. The operation method according to claim 8, further comprising:

generating at least one inverted clock signal by at least one inverter of the second die based on the at least one second gained clock signal to the at least one second data channel, wherein each of the at least one output terminal of the second clock tree circuit is coupled to an input terminal of a corresponding one of the at least one inverter, an output terminal of each of the at least one inverter is coupled to the trigger terminal of a corresponding one of the at least one second data channel, and each of the at least one output terminal of the second clock tree circuit is coupled to the trigger terminal of a corresponding one of the at least one second data channel through a corresponding one of the at least one inverter; and outputting at least one second data signal by the at least one second data channel based on triggering of the at least one inverted clock signal.

13. The operation method according to claim 8, further comprising:

generating at least one third gained clock signal by a third clock tree circuit of the second die based on the source clock signal from the clock interconnect to at least one third data channel of the second die, wherein an input terminal of the third clock tree circuit is coupled to the second terminal of the clock interconnect to receive the source clock signal of the first die, and each of at least one output terminal of the third clock tree circuit is coupled to a trigger terminal of a corresponding one of the at least one third data channel; and outputting at least one third data signal by the at least one third data channel based on a trigger of the at least one third gained clock signal to at least one second data interconnect of the package interconnect portion, wherein an output terminal of each of the at least one third data channel is coupled to a first terminal of a corresponding one of the at least one second data interconnect.

14. The operation method according to claim 13, further comprising:

generating at least one fourth gained clock signal by a fourth clock tree circuit of the first die based on the source clock signal of the first die.

15. The operation method according to claim 14, further comprising:

outputting at least one fourth data signal by at least one fourth data channel of the first die based on triggering of the at least one fourth gained clock signal.

16. The operation method according to claim 14, further comprising:

generating at least one inverted clock signal by the at least one inverter of the first die based on the at least one fourth gained clock signal to at least one fourth data channel of the first die, wherein an input terminal of each of the at least one inverter is coupled to a corresponding one of at least one output terminal of the fourth clock tree circuit, a trigger terminal of each of the at least one fourth data channel is coupled to an output terminal of a corresponding one of the at least one inverter, and an input terminal of each of the at least one fourth data channel is coupled to a second terminal of a corresponding one of the at least one second data interconnect, and outputting at least one fourth data signal by the at least one fourth data channel based on triggering of the at least one inverted clock signal.

* * * * *